Patented May 6, 1941

2,241,321

UNITED STATES PATENT OFFICE 2,241,321

PREPARATION OF POLYAMIDES

Paul Schlack, Berlin-Treptow, Germany, assignor to I. G. Farbenindustrie Aktiengesellschaft, Frankfort-on-the-Main, Germany No Drawing. Application July 20, 1938, Serial No. 220,266. In Germany June 10, 1938

10 Claims. (Cl. 260—2)

This invention relates to polymerizates of lactams of amino-acids.

By heating aminocarboxylic acids to a high temperature there are obtained, with formation of polyanhydrides, condensation products which, insofar as they are stable against heat, may attain a very high molecular weight. Polymeric substance of this kind have been obtained, for example, from 6-aminohexanoic acid (compare v. Braun, Berichte vol. 40, page 1840, 1907). Although it has already been proposed (U. S. Patents Nos. 2,071,250, 2,071,251 and 2,071,253) that polyanhydrides of this type may be worked up into shaped structures having good properties, particularly threads, the practical utilization of these artificial materials, which closely resemble protein substances from a chemical point of view, has been limited, because the necessary aminocarboxylic acids are not readily available. Although the parent material for one or the other product could be obtained in sufficient quantity and quality, the difficulty of isolating the amino-acids and purifying them from water-soluble secondary products always remains. Moreover the condensation reaction does not always proceed satisfactorily, a fact which frequently becomes evident only in working up the product to a shaped structure.

It is therefore an object of the present invention to provide a process of producing polymerizates of lactams of amino-acids.

A further object is the provision of a process by which polymerizates can be obtained, which are capable of being worked up into fibers, films, foils and the like.

A further object resides in the provision of a process which leads to polymerizates of exceedingly high molecular weight and high softening point.

A still further object of the invention resides in the provision of an essentially simplified process of producing linear superpolymers.

Another object is the provision of a polymerization process in which the necessity of removing volatile reaction products is avoided.

An additional object resides in the provision of suitable polymerization catalysts, which enable the polymerization of the lactams of aminc-acids to be carried out on an industrial scale in a comparatively short time of reaction.

A further object resides in the selection of catalysts, which are capable of substantially influencing the properties of the final products.

Other and additional objects will become apparent as the following description proceeds.

This invention is based on the observation that very valuable polymers of the kind referred to, especially derivatives in which the groups occupying the two ends of the molecule are substituted, are obtainable in a simple manner and with certainty if instead of, as heretofore, condensing the amino-acids at a high temperature with elimination of water, the monomeric anhydrides (lactams) of amino-acids having a chain of at least 5 carbon atoms between a carboxyl and an amino group, and obtainable in various ways, are heated, preferably in the presence of relatively small quantities of suitable promoters of the reaction, until polymerization occurs.

This polymerization is conducted in the melt, if desired in the presence of a solvent such as an amide or a phenol. It generally occurs with remarkable smoothness and leads to highly polymeric products applicable for various purposes. The properties of the final products may be determined beforehand, so that they are of great commercial value.

This result is highly surprising, for it was to be expected that the polymerization, if it would occur at all, would lead, at least at a high temperature, only to substances of comparatively low degree of polymerization. Moreover, it had to be assumed that at a high temperature in the presence of a catalyst, especially in the case of those of pronounced acid character, a splitting up of the chain into fractions of low molecular weight would occur, which would most probably be monomeric cyclic compounds, as had been already observed in the case of poly-condensations of hydroxycarboxylic acids or of glycols and aldehydes.

The amino-acid anhydrides (lactams) which come into question for use in the invention are obtainable in various ways, for example by rearrangement of cyclic ketone-oximes according to Wallach or by introduction of the residue —NH— into cyclic ketones with the aid of hydrazoic acid by the method of K. F. Schmidt. They may also be obtained during the reaction from closely related compounds, for example by the decomposition of the hydrogen halide salts of the corresponding lactim ethers. Some are also obtainable by converting the corresponding amino-acids into anhydrides or as by-products in the thermal condensation of such amino-acids or their esters. The cyclic lactams, unlike the free amino-acids may be isolated comparatively easily and brought to a very pure condition by recrystallization or distillation or both. This advantage is very important, since the certainty of the operation and the quality of the final product, especially as regards the degree of polymerization and color, which are wholly dependent on the kind of impurities, are considerably improved by purification of the monomers.

Lactams which are of importance for the invention are, for instance, the following: cyclohexanone isoxime, the products of conversion or rearrangement of 2-methylcyclohexanone oxime, of 3-methylcyclohexanone oxime and 4-methylcyclohexanone oxime, cycloheptanone isoxime, the products of rearrangement of 2-methyl-cycloheptanone isoxime, 2-ethylcycloheptanone oxime, cyclo-octanone isoxime.

The tendency of the lactams for chain polymerization differs somewhat in accordance with their structure. The 7-membered monomers of which especially the $\epsilon$-caprolactam is of importance on account of its being easily accessible, polymerize only after comparatively long heating in pure condition, apparently after alkaline decomposition products, primarily ammonia, have been formed, which then act as amide splitting catalyst. Even the material of the vessel, for instance glass, may in some cases play a part. Impure products polymerize easily, but the quality of the final product is highly dependent upon the kind of these impurities and naturally also on their proportion.

$\epsilon$-caprolactam, obtained from cyclohexanone which still contains oxime decomposable during the reaction, is apt, for example, to yield very dark products, generally even somewhat brittle and smelling disagreeably of bases. These are not useful for making threads of high value. Essentially more advantageous is the conversion of the lactam into the polymer in the presence of definite proportions of added catalysts. These catalysts are further discussed hereinafter.

Lactams which correspond with the $\epsilon$-aminomethylene carboxylic acids and are not substituted at cyclic carbon atoms are in general to be preferred. They polymerise very smoothly and products are obtained of especially high melting point and very well adapted for forming oriented threads, sheets and like structures. For example, $\epsilon$-caprolactam yields an opaque, almost colorless artificial polymer melting at 210° C. and of high tenacity and elasticity. A very similar product is obtained from the homologous 8-membered lactams (suberone isoxime). The lactams from the oximes of the 3 isomeric methyl-cyclohexanones, on the other hand, react less uniformly; in particular, more basic secondary products are produced. The polymerizates in these cases are transparent polymers of comparatively low melting point; threads and foils produced therefrom are correspondingly of lower value. It is to be supposed that the orientation in these cases is prevented not only by the presence of side chains, but also by the occurrence of stereoisomerides and/or structural isomerides. By careful choice of the accelerators used, however, the results are quite favorable even in the case of substituted products.

The lactams having a number of ring members higher than 7 have a high tendency for polymerization and the reaction temperature may be correspondingly lower. When the number of ring members is very high (above 14) the tendency for reaction appears to decrease in conformity with the observations concerning the easier formation of such rings. The polymers of these lactams of high molecular weight have, however, comparatively low melting points.

When the $\epsilon$-caprolactam, preferred on commercial and other grounds, is used, the temperature of the reaction may be between 180 and 250° C. The heating may be carried out in stages, a very high temperature being maintained at the final stage for a comparatively short time. This precaution, however, is not unconditionally necessary. Good products are also obtained if the mixture undergoing reaction is kept at a constant relatively high temperature, for instance when salts of amines or amino-acids are used as accelerators.

The duration of the reaction may also vary within wide limits. In the case of certain parent materials and certain accelerators, time may be saved in many instances if the catalyst is added in portions. The duration of heating can also be shortened if at the conclusion there follows a recovery of unreacted monomer by a vacuum treatment of or an extraction from the solid or liquid polymerizate.

It is to be recommended, however, that the heating should be conducted for a longer period if the monomer is to be utilised as far as possible. For example, if $\epsilon$-caprolactam is heated in a closed vessel in the presence of 1.2 per cent of aminocaproic acid hydrochloride at 230° C., by far the greater part (85 to 92 per cent) polymerises after 12 to 24 hours.

The accelerator for the polymerization may vary considerably. Although its mode of action is not quite clear in all cases, the catalyst should in general be a substance which reacts with the lactam either at the temperature of the reaction with rupture of the ring and formation of substances having at least one reactive end group or which determines the reactions which lead to the formation of such end groups. The acceleration of the decomposition of the lactam with elimination of ammonia, whereupon apparently the ammonia formed induces polymerization, may be regarded as a reaction of this kind.

Correspondingly, acceleration occurs also if a small portion of water or of a hydroxyl compound or of a mercaptan is added. Since these substances, at least when the operation is conducted in a closed vessel, react in part stoichiometrically or in part until a definite equilibrium is attained, it is necessary in most cases to exactly adjust their proportion in order that good reproducible results may be obtained. This is especially the case with alcohols and mercaptans of high molecular weight. In the case of materials of lower molecular weight, for instance water, the action of the catalyst is compensated in the course of the heating, particularly in the final phase. In certain cases, for instance when phenols are used, a considerable excess may be employed. Advantageously the catalyst materials used, if desired in conjunction with water or hydroxyl or sulfhydril compounds, are acids, bases or salts or substances or mixtures of substances which form these. A series of suitable substances or mixtures of substances are enumerated in the following compilation.

1. Inorganic compounds

Water, ammonia hydrogen bromide (as aqueous acid having a specific gravity of 1.48), mixture of sulfuric acid and water in proportion of 98:36, ammoniumbifluoride, lithium chloride, hydroxylaminohydrochloride, magnesium chloride, zinc chloride, borofluoride-dihydrate, aluminium chloride and other catalysts for Friedel Craft's reactions, sodium amide, lithium hydroxide.

2. *Organic hydroxyl- and sulfhydril compounds*

Benzyl alcohol, omega-dimethylamino-para-ethylphenol, dodecyl-alcohol, cholesterin, thioglycollic acid dodecyl ester, iso-octylphenol and iso-octylphenol ethyl ether.

3. *Amines and salts of organic amine-compounds*

Benzylamine, octadecylamine, octamethylenediamine, guanidine carbonate, N-butylaminofluorosulfonate, dodecylaminohydrochloride, abietinylaminohydrochloride, 9-aminopentatriacontane hydrochloride, butanolamino-hydrochloride, $\beta$-chloroethylaminohydrochloride, triethylenetetramine-tetrahydrochloride, $\beta,\beta'$-diaminodiethylether-dihydrochloride, $\beta,\beta'$-diaminodiethylsulfide-dihydrochloride, anilinohydrochloride, benzidine-dihydrochloride, para-aminothiophenolhydrochloride, pyridine-camphorsulfonate, histaminedihydrochloride, melaminehydrochloride, sarcosinehydrochloride, cyclohexane-$\alpha$-aminocarboxylic acid hydrobromide, para-aminobenzoic acid hydrobromide, aminoethanesulfonic acid, sulfanilic acid.

4. *Organic acids and acid derivatives*

Toluenesulfonic acid, naphthalenesulfonic acid, meta-sulfobenzoic acid (these above preferably in the presence of small quantities of water, of mono- or polyvalent alcohols, phenols or mercaptan, for example of benzyl alcohol, phenoxyethyl alcohol, diethylene-glycol, hexamethylene-glycol, vinyl-octadecyl ether), hydroxy-ethanesulfonic acid, adipic acid, terephthalic acid chloride, cyanuric chloride, 1.3.5-benzenetricarboxylic acid chloride, laurylcyanamide, toluenesulfonic acid ethyl ester in presence of very small quantities of water ($\frac{1}{200}$ mol ester plug $\frac{1}{200}$ mol water to 1 mol lactam).

5. *Salt-like organic compounds especially such as are of preponderant basic character*

Potassium carbazole, aluminium ethylate, magnesium oleate, potassium acetate in combination with cyclohexanol or dodecyl-alcohol, sodium salt of sulfosalicylic acid.

6. *Substances which react with formation of organic acids*

Benzyl chloride, para-xylylene bromide, butylchloromethyl ether, especially in presence of small quantities of water, alcohols, phenols or mercaptans, which may be present in small excess as compared with the halogen compound.

The substances listed above, so far as they are used for the polymerization of $\epsilon$-caprolactam (recrystallized and dried over calcium chloride) are added in the proportion of $\frac{1}{100}$ to $\frac{1}{200}$ equivalent. The polymerization occurs during 36 to 64 hours in a closed vessel at about 225° C. A comparative polymerization without a catalyst occurs after about 96 to 102 hours.

Instead of free acids, functional derivatives thereof may be used, if they have a tendency to acylate reactive hydrogen, especially acid chlorides. Also, however, freely reactive acid esters, for instance phenol esters of carboxylic acids, and acid amides, may be used.

Salts of amino compounds capable of acylation, particularly those having primary aminonitrogen have proved especially useful. Salts of secondary amines are in general less advantageous, since they appear to accelerate also the splitting off of ammonia. Of the salts of primary amines those of the amino-acids are of especial interest, because they favor a very uniform course of reaction. Since the number of the end-groups finally present and therewith the degree of polymerization depends upon the proportion of the catalyst capable of forming stable end-groups, this proportion will in general be kept within comparatively narrow limits, at least when production of very highly polymeric products is desired. In most cases, it has proved advantageous to keep the proportion of the substance which determines the formation of the stable end-groups, for instance hydrochlorides of amino-acids, below $\frac{1}{50}$ equivalent calculated for the reaction which forms the end-groups during the main reaction period. It must be kept in mind, however, that in many cases it cannot be ascertained how much of the added accelerator is in fact consumed for the formation of the end-groups. Occasionally, suitable substances for forming end-groups are so changed that they cannot be regenerated. In the case of aminosulfonic acids, for instance sulfanilic acid, it has been observed that the sulfo-groups are eliminated.

When the catalyst is decomposed in the course of the heating without formation of stable end-groups or if it is distilled off or becomes chemically inactive, then obviously a larger proportion of catalyst may be added; for example when mixtures of lactams and amino acid esters are heated or when vapor of ammonia or an amine of low molecular weight is passed through molten lactam or mixture of lactams at a suitably high temperature, if desired under pressure.

The nature of the final product may be influenced both by the chemical composition of the catalyst and also by the proportion and the manner in which it is added. When the catalyst used is one which is practically not decomposed and acts as a true catalyst, for instance an inorganic halide in the presence of at least a trace of water, large variations in the proportion may have no essential influence on the properties of the final product. In contrast thereto the situation is different, as has already been indicated, if the catalyst or constituent thereof, for example the cationic portion of a salt, is decomposed during the reaction more or less profoundly for the formation of the stable end-groups or of substances producing the end-groups. In such cases the desired degree of polymerization may be controlled and predetermined within certain limits by using the catalyst in exact portions. The possibility of influencing the final product so simply is an essential advantage of the process. Moreover, the electrochemical character of the polymers (affinity for dyes) may be predetermined by the selection of the substituents for the end-groups.

The higher the degree of polymerization, the more the capacity for binding acid and therewith the quantitative adsorption of acid dyestuffs by the polymerizate or by the structure formed therefrom diminishes. This decrease in affinity for dyestuffs may be counteracted if such compounds capable of forming end-groups adapted to be acylated are used as catalysts, which besides the groups capable of acylation and of reaction with the lactam, for instance hydroxyl or amino-groups or both, contain basic groups which are incapable or only little capable of being acylated. Such materials are, for example, unsymmetrical dimethylpropylenediamine, omega-piperidopentylamine, and others having more than one nitrogen atom (see the table of pages 9 to 11). By suitable choice of the catalyst forming the end-groups the capacity of the structure of being wetted out and swollen may be influenced within certain limits, for example the polymer obtained in the presence of the hydrochloride of the ε-aminocaproic acid from ε-caprolactam may be wetted comparatively easily in fiber-form and adsorbs acid dyestuffs very rapidly, essentially more quickly than wool. An analogous product which can be obtained by employing octadecylamine hydrochloride as catalyst is dyed comparatively slowly and behaves more like wool, and is about the same as the polymer from cycloheptanone isoxime made with use of the corresponding amino-acid hydrochloride as the catalyst of the polymerization.

Also there may be used with advantage as catalyst polymeric condensation products incapable of being drawn out into fibers from diamines and dicarboxylic acids or dicarboxylic acid esters, for instance from sebacic acid and octamethylenediamine or even moderately polymeric condensation products from amino-carboxylic acids or amino-carboxylic acid esters, as well as salts thereof, for instance salts with hydrogen halides. Correspondingly, there come into the ambit of the invention reactions in which, by condensation of amino-carboxylic acids or of derivatives thereof, for instance esters, besides polyanhydrides, considerable quantities of monomeric anhydrides are produced. In this case the reaction is for instance carried out in such a manner that at first condensation occurs in which water, alcohol or the like is split off, and the volatile products are removed, whereafter there is added a substance which strongly accelerates the polymerization of the monomer followed by further heating preferably in a closed vessel until the reaction is brought practically to an end. Suitable substances for addition are, for example, hydrogen bromide, naphthalene sulfonic acids, amino-acid hydrochlorides, benzyl chloride, octadecylamine. However, such accelerators may also be added at the beginning of the condensation. Thus, for example, the condensation of 6-aminohexanoic acid or its ester may be conducted practically to the end, whereas in direct condensation of the pure acid up to 35 per cent of the acid is lactamized and remains unreacted.

In using catalysts capable of forming end-groups, which catalysts have more than two reactive groups, for example hydrochlorides of tri- and polybasic amines, especially primary amines or acid chlorides of tri- or polybasic carboxylic and sulfonic acids, there may be produced three-dimensional but not intermeshed products which are fusible and soluble. These products are of especial interest for many purposes, since they may be hardened or tanned by the action of substances having in the molecule at least two amino- and/or carboxyl-groups, thus diminishing its capacity for swelling and raising the melting point.

Suitable substances are polyfunctional compounds having alkylating and/or acylating groups, also reactive carbonyl compounds and functional derivatives thereof, for instance dicarboxylic acids and their derivatives, such as adipic acid, maleic acid anhydride, diphenylcarbonate, dimethyloxalate, cyanuric chloride, diisocyanates, for instance para-phenylene-diisocyanate, and such substances producing diisocyanates on heating, such as hexamethylene-bis-carbamic acid methyl ester, hexamethylene-bis-carbamic acid phenyl ester; compounds having both alkylating and acylating function, for instance methylchloracetate, methylacrylate; polyvalent alkylating agents, for instance 1.4-dichloro-butene, epichlorhydrin, tetrachlorohydroxypropylammonium chloride, butadiene-dioxide, butadiene-disulfide, α.α'-dichlordimethyl ether; also formaldehyde and quinone.

Such subsequent structural variations which, if they occur less fundamentally or in several stages, may be realised or induced not only before the shaping operation, but also in many cases together with the shaping or subsequently thereto, and are, although less pronounced, occasionally possible also in products with only two-dimensional unbranched chains, especially when groups with certain specific reactivity are comprised. Such groups are, for instance (especially end-groups) of the phenolic kind as well as primary carbamide groups, guanidine groups and biguanide groups. Since these reactions are generally limited to end-groups, there is no danger that the elasticity of the structure will be lost by too profound a network. After-treatment with freely reactive substances, for instance formaldehyde, may with advantage be undertaken in connection with an improvement of the shaped structure, for instance in connection with a stretching operation.

The presence of the polymerization catalyst of saline or salt-forming character or a conversion product thereof does not in general disturb the working-up of the product of the process, and its shaping to the desired structure. Occasionally, indeed, their presence may have certain advantages, for example when the object is to produce staple fibers which, in order to facilitate their working up, are strongly crimped. In other cases, to be sure, the catalyst residue favors the discoloring of the material and at the same time corrosion of the apparatus may occur. A coloristic effect is produced by the presence of acid accelerators, for example strong acids and salts of strong acids with organic bases, so that the structures obtained from the polymers adsorb acid dyestuffs very rapidly and in some cases unequally. This fault may be remedied by a preliminary washing before the dyeing, in which the washing liquid may contain with advantage a mild alkali, for example an alkali acetate, borax, ammonia or ammonium carbonate, for the complete removal of the acid anions.

Even if the dyeing properties are disregarded, it is in many cases of advantage to add an alkaline or acid binding agent towards the end of the polymerization, if desired before or during the removal of gases. Suitable substances are those which unite with acids or acid groups to form non-ionogenic compounds, and possibly cause substitution at amino-groups.

In this connection there may be named, for instance, alkaline compounds such as ammonia, alkali acetate, alkali stearate. Preferable, however, are the usual organic bases or organic substances which yield such bases, for example salts of the bases with weak acids or acids which, in comparison with the base, are volatile; for instance amines, amine salts (amine soaps), amides, for example amides belonging to the group of carbonic acid derivatives. Among the amines are especially the polyamines, especially those of high molecular weight, and of resinous character. Particular materials suitable for this stage of the process are cyclohexylamine, cyclohexylamine-oleate or -stearate, octamethylenediamine, octadecylamine, octadecylamine-acetate, octadecylpolyethyleneimine, resinous condensation products from alkylene-imines and isocyanates, cyclohexylurea, dicyandiamide, melamine, guanidine salts, cyclic and acyclic isourea ethers and isothiourea ethers.

Favorable results are obtained also if for eliminating or compensating acid properties there is added afterwards a reactive alkylating agent and/or aminating agent which reacts with the acid or basic groups present. There may be used either the ordinary alkylating agents of the ester type or substances which yield these, for instance quaternary salt in the presence of a separate acid binding agent, for instance magnesium oxide, or with special advantage a cyclic alkylating agent having a tendency to combine with the reactive groups with ring scission. Of these latter the following may be named: Ethylene oxide, propylene oxide, butadiene dioxide, epichlorhydrin, phenoxypropene oxide, paraphenylene-hydroxypropene oxide, piperidopropene oxide, N-dodecyl-methylaminopropene oxide, propylene sulfide, butadiene-disulfide, ethylene-imine, N-cyclohexylethyleneimine, N-butylethylene-imine, C-phenylethyleneimine, dodecylethyleneimine. The alkylene-imines and their derivatives react particularly freely if the substratum contains ionogenic halogen.

If the added reactive substances containing basic nitrogen are fixed in the fibers, films etc. so that they cannot be washed out, or if they react with the polymer, there is simultaneously obtained an increase in the total affinity which is desirable for attaining dyeing properties similar to those of animal fibers, especially when the material has a high degree of polymerization.

If the first desideratum is to enhance the basic character of the polymer, polyamines of high molecular weight or high degree of polymerization may be used which cannot react with the lactam polymerizate with formation of an amide, for example those having exclusively tertiary basic nitrogen or even polyamines of high molecular weight in the form of any desired salt so far as these are miscible with the molten mass or the solution, for instance salts of polymeric alkylene polyamine with organic sulfonic acids. It is of especial advantage to use salts when the free amine bases are not sufficiently stable to heat.

The polymerization may be performed in various ways. Since in contrast with condensation processes there are normally no, or at least very little, volatile secondary products, the monomer or a mixture of monomer may simply be heated together to the necessary temperature, if desired in presence of the catalyst in a closed vessel until the desired degree of reaction has been produced or the reaction proceeds no further. Preferably, the mass undergoing reaction is stirred continuously or at least at intervals. However, this is not unconditionally necessary, especially if care is taken to provide means for uniformly distributing the heat, for instance thermally conductive ribs or like insertions. The products obtained may frequently be worked-up into shaped structures without further treatment, especially if the temperature is raised towards the end of the reaction for some time, for example for 2 to 8 hours by about 10 to 30° C. over the ordinary reaction temperature. It is to be recommended that at least towards the end of this afterheating any pressure in the apparatus should be relieved and the mass allowed to rest until no more gas bubbles escape. In this manner volatile monomeric constituents in the mass may be recovered. The removal of these volatile portions may be accelerated and completed by diminution of pressure. It is most advantageous to separate the volatile constituents in the reaction vessel itself without allowing the mass first to solidify.

Both during the reaction and also during the afterheating access of atmospheric oxygen must be prevented as completely as possible. When the operation is conducted in a closed apparatus this presents great difficulty. It is best to charge the vessel before the reaction with carbon dioxide and to maintain a slight excess pressure due to carbon dioxide during the polymerization process, in cases where it is not convenient to close the vessel hermetically. There may also be added to the mass special anti-oxygens, for example phenol derivatives, if their function is not already performed by the catalysts for the reaction. The effect of such additions is, however, comparatively small at the high temperatures usually employed. Moreover, it is to be noted that the degree of polymerization may be affected by the anti-oxygens. It is more effective to prevent access of air by means of a layer of a specifically light and sparingly volatile liquid which is immiscible with the mass undergoing reaction or the product of the reaction, for instance a layer of paraffin of melting point between 40 and 80° C. Such a protective medium may be present from the beginning but in general it is convenient to add it after the main reaction has ended and before the after-heating (removal of gases) begins. In this case it is advantageous to allow the liquid or molten protective material to enter through small apertures in the bottom of the vessel and thus to rise through the mass, whereby there is attained a more rapid removal of the volatile or monomeric or soluble constituents still present. This extraction can be applied continuously. From the extract which flows away, the dissolved monomers, the proportion of which may amount for example to 2 to 10 per cent of the mass, may be removed by vacuum distillation or by extraction with a solvent, for example with water or a dilute aqueous mineral acid. The aqueous solution may be worked-up for the pure monomer, which may be returned to the reaction mixture for further reaction. In the second case there exists the possibility, among others, of boiling the solution to hydrolyze it and working it up to obtain salts of amino-acids which may find further use as catalyst. The presence of paraffin or the like is also of advantage when emptying the reaction vessel. In working discontinuously it is possible to empty the vessel almost completely without involving a deterioration of the quality of the last portions.

In making the polymerizates on a large scale the operation may be continuous, for example the molten mixture of monomer and catalyst may be forced through heated tubes of material that resist corrosion, for example, V₂A-steel, at such a speed that the mass retains the desired temperature for the necessary period. For improving the intermixture and the uniformity of temperature, as well as for aiding the forward movement, the mass may be stirred by means of worms of resistant material in the pipes, which in this case are of comparatively wide dimensions.

It has been found useful to add one or more vacuum containers in series at the end of the apparatus into which the mass enters and is there freed as thoroughly as possible, continuously or discontinuously, from its volatile constituents. This vacuum treatment also is advantageously conducted beneath a fluid which may circulate to ensure exclusion of atmospheric oxygen. By using two or three such containers in series, the temperature and/or vacuum is raised in stages.

The finished product, to which, if desired, any usual addition, for instance a softener, a resin, a pigment, an animalizing agent, as well as other soluble or fusible organic highly polymeric body capable of forming film or threads, may be incorporated, may be conveyed directly in liquid, that is to say dissolved or molten condition, to the place of use. Alternatively, the molten mass may be extruded through heated extrusion pipes or nozzles in the form of endless rods or bands. In this case the temperature is to be so regulated that the extruded mass is solidified uniformly throughout its whole cross section before it leaves the apparatus. This is facilitated when the extrusion is from below upwards. The rod thus obtained may be cut to suitable lengths or forwarded in continuous form to the place of use, which may be higher up in the building. The extrusion of the rod from the cylindrical mouth-piece is facilitated if the inner surface of the cylinder is fed with a lubricating fluid, especially paraffin, through an annular groove.

The following examples illustrate the invention:

*Example 1.*—0.75 gram of $\epsilon$-aminocaproic acid hydrochloride is dissolved in 100 grams of pure $\epsilon$-caprolactam, and the solution is heated in a sealed glass tube charged with carbon dioxide for 64 hours at 225° C. After the cooled tube has been opened, the product may be removed in the form of a nearly colorless very strong elastic rod. This artificial material melts at about 210° C. After a preliminary heating in the melt at 245° C. until the liquid is at rest, the mass may be spun continuously and at constant pressure to form uniform threads, the temperature of the spinning nozzle being 225° C. The tenacity of the threads in stretched condition is 6 grams per denier. The fibers, (single titer 3 deniers) have a predominating basic character. Correspondingly they are intensely dyed by acid and substantive dyestuffs, whereas basic dyestuffs are adsorbed only slightly. The fastness of the dyeings with acid or substantive dyestuffs to wetting and light is in general similar to the analogous dyeings on animal fibers. The capacity for binding acid is 0.0078 gram equivalent per 100 grams.

If instead of 0.75 gram of $\epsilon$-aminocaproic acid hydrochloride 1.5 grams are used, there is obtained a somewhat brighter product which, however, is of a lower degree of polymerization and can still be spun to threads of good tenacity. If the quantity is increased to 3 grams, the degree of polymerization for spinning continuous threads from the molten mass is not or scarcely achieved. By prolonged after-heating at 250° C. the spinning capacity can in the latter case be improved.

*Example 2.*—2000 grams of pure $\epsilon$-caprolactam, in which are dissolved 15 grams of $\epsilon$-aminocaproic acid hydrochloride, are heated in an enamelled vessel provided with a stirrer in an atmosphere of carbon dioxide while carefully excluding atmospheric oxygen for 48 hours at 225° C., whereupon the slight pressure is relieved. There are then added, while stirring, 5 grams of $\epsilon$-aminocaproic acid hydrochloride and the mass is further heated for 16 hours at 240° C., the pressure being strongly diminished during the last 8 hours, say to about 2 mms. After this period the contents of the vessel are expelled by carbon dioxide pressure through a vertical calibrated tube. This tube is so regulated as to temperature that the mass solidifies during this passage, and so issues until the vessel is empty in the form of a continuous nearly colorless rod of 16 mms. diameter. This polymerization product is very suitable for making artificial threads, bristles, ribbons and other shaped structures therefrom.

*Example 3.*—1 mol (113 grams) of $\epsilon$-caprolactam is heated together with $\frac{1}{200}$ mol (=0.68 gram) of cyclohexylamine hydrochloride for 60 hours at 220° C. and then the mass is pressed under molten paraffin through a narrow slot nozzle (d=0.2 mm.). The extruding film is cooled by a blast of carbon dioxide and is received directly in an extraction apparatus in which it is freed by means of hot methanol from monomers or soluble constituents. The loss of weight by this treatment amounts to about 8 per cent.

*Example 4.*—113 grams of $\epsilon$-caprolactam are melted together with 1.53 grams of octadecylamine hydrochloride ($\frac{1}{200}$ mol) and the mass is heated with exclusion of oxygen for 24 hours at 200° C., 24 hours at 225° C. and for 12 hours at 235° C. The polymer thus obtained may be easily spun from the melt to artificial threads. These threads are essentially more hydrophobic than those obtained from the artificial material described in Example 1. They absorb acid dyestuffs more slowly and in this respect more closely resemble wool.

*Example 5.*—A solution of 1.075 grams of 3-piperido-propylamine dihydrochloride is heated to 228° C. in 113 grams of molten $\epsilon$-caprolactam for 48 hours in a closed vessel in an atmosphere of carbon dioxide. The product which is only feebly colored and is very elastic may be spun continuously from the mass, which has been heated in the melt at 240° C. until free from bubbles, through spinning nozzles having a diameter of 0.3 mm. at a temperature of 215° C. The product has a somewhat higher affinity for dyestuff than that of Example 1.

*Example 6.*—100 grams of $\epsilon$-caprolactam and 1.53 grams of octadecylamine hydrochloride (=$\frac{1}{200}$ mol calculated on the lactam) are melted together and the mass is heated for 48 hours at 230° C. After this period, 1 gram of unsymmetrical methyloctadecylethylenediamine dihydrochloride ($\frac{1}{400}$ mol calculated on the lactam) is added while stirring and the mass is again heated for 12 hours at 230° C. in an atmosphere of carbon dioxide. At the end of this operation the mass is covered with molten paraffin (melting point 72° C.) and heated for 4 hours in the vacuum at 230 to 240° C. Immediately afterwards the mass, which still contains only a very little monomer, is spun directly. The threads which are after-stretched to a fineness of 4 deniers and subjected to an alkaline washing for removing the bound chlorine ions, exhibit a great similarity to wool in their dyeing properties.

*Example 7.*—Mono-oleyltriethylenetetramine is treated with dimethyl sulfate in presence of alkali until on application of an acylation test with acetic acid anhydride, hydrogen capable of exchange can no longer be recognized at the basic nitrogen.

The product is then saponified with strong hydrochloric acid at 150° C. and the hydrochloride is isolated. 0.87 gram of this dry salt, which contains a primary amino-group in the molecule, is melted with 113 grams of ε-caprolactam and the mixture is heated with exclusion of oxygen first for 24 hours at 200° C. and then for 36 hours at 250° C. Artificial fibers obtained from this polymerizate have a higher affinity for dyestuffs than have the products of Example 1.

A similar rather more favorable result is obtained if, instead of triethylenetetramine, the reaction product of para-dichloromethylbenzene on 1.3-propylenediamine or 1,6-diaminohexane is used.

Example 8.—In 113 grams of molten ε-caprolactam is dissolved 0.47 gram of hexamethylenediamine dihydrochloride (=1/400 mol calculated on the lactam), and the mixture is heated for 60 hours at 230° C. The polymerizate thus obtained is of very high molecular weight, apparently because the chain formation occurs at least in part simultaneously in two directions. It may be spun at 240° C. to threads of very high tenacity.

Example 9.—11.3 grams of pure ε-caprolactam, 0.21 gram of finely powdered lithium chloride, and 0.09 gram of water are heated together in a reaction vessel to 225° C. The polymerization product, which smells freely of ammonia owing to a secondary reaction, may be drawn in molten condition to threads which have sufficient tenacity for technical purposes.

Example 10.—12.7 grams of isoxime obtained by transformation of 2-methylcyclohexanone oxime and 0.084 gram of ε-aminocaproic acid hydrochloride (=1/200 mol) are heated together for 48 hours at 240° C. There is obtained a transparent but still freely sticky polymer which can be drawn to threads.

Quite similar products are produced when 3- or 4-methylcyclohexanone oxime is substituted for 2-methylcyclohexanone oxime.

Example 11.—12.7 parts of suberone-isoxime is heated with 0.064 gram of ε-aminocaproic acid hydrochloride (1/200 mol) for 60 hours at 225° C. in a closed vessel. The product, which is only feebly colored, may be spun to threads in the molten state or by the wet spinning process with use of dilute alkali or alcohol as the precipitating bath.

The threads obtained from the molten product become wet in water with more difficulty than the threads made as described in Example 1 and adsorb water-soluble dyestuffs more slowly or only at a higher temperature. In this respect they behave more closely like wool than do the fibers from the polyanhydride of ε-aminocaproic acid.

Example 12.—113 grams of ε-caprolactam are heated with 1.53 grams of octadecylamine hydrochloride (=1/200 mol) for 60 hours at 225° C. and the mass is added to 1.7 grams of symmetrical methyl-N-triethyl-isothiourea in molten condition. Apparently in this operation a portion of the combined halogen volatilizes in the form of methyl chloride. In addition, methyl mercaptan is separated; it is to be supposed that the free end amino-groups become guanidine groups. To this cause also may be ascribed the considerable stability towards nitrous acid of the material obtained.

Example 13.—11.3 grams of ε-caprolactam are heated with 1 gram of meta-aminophenyl hydrochloride (=about 1/150 mol calculated on the lactam) with exclusion of atmospheric oxygen for 16 hours at 200° C. and for 48 hours at 230° C. The whole of the aminophenol is consumed, doubtless with formation of the anilide. The spun fibers obtained from the product may be after-treated by the process described in U. S. patent Application Serial No. 94,197 filed August 4, 1936, with dimethylaminomethanol and similar substances, whereby the affinity to acid dyestuffs is enhanced. Moreover, the capacity of the threads to swell in water may be diminished if they are treated with a formaldehyde solution of hexamethylenetetramine and then are conducted with simultaneous stretching through a tube heated to about 160° C.

Instead of the meta-aminophenol hydrochloride there may be used 0.79 gram of β-para-hydroxyphenylethylamine hydrochloride (=1/200 mol). In this case also the affinity may be enhanced by after-treatment with dimethylaminomethanol.

Example 14.—6-aminohexanecarboxylic acid methyl ester is heated in an atmosphere of hydrogen at 180 to 210° C. until the elimination of methanol is practically at an end. To the mixture of polyanhydride and lactam thus produced there is added 1/200 mol of naphthalene-β-sulfonic acid calculated on the ester material, and the mixture is heated for 24 hours in a closed vessel at 235° C. the heating for the last 3 hours being under molten paraffin in a vacuum of 6 mms. The polymer obtained may be spun without purification to very good threads by continuously forming them from the molten mass (temperature of 230° C.). The reaction is somewhat accelerated if a small proportion of a phenol, for instance para-butylphenol, is added. In this case an alkali phenolate may also be used as a catalyst.

Example 15.—113 grams of ε-caprolactam are heated with 1.35 grams of octadecyl alcohol (=1/200 mol) in an atmosphere of carbon dioxide in a closed vessel for 50 hours at 235° C.; the pressure is then released and the mass is further heated under paraffin at 250° C. and finally with application of a vacuum. The product heated in all for 60 hours is practically colorless and may be spun to good threads. It is also suitable for making sheets, coatings, as well as cast and pressed moulded bodies of very various kinds. The polymerization is more rapid if 1/200 mol of a naphthalene-sulfonic acid is added.

Example 16.—113 grams of ε-caprolactam are heated with 0.63 gram of benzyl chloride (=1/200 mol) for 48 hours at 230° C. in a closed vessel. There are then added while passing in nitrogen 3 grams of octadecyl-polyethyleneimine and the mass is slowly heated further to 245° C., a vacuum of about 6 mms. being applied towards the end. The threads obtained from this produce have a high affinity for acid dyestuffs.

Example 17.—14.1 grams of suberone-isoxime and 0.37 gram of adipic acid (=1/400 mol) are heated together for 24 hours at 200° C. and for 24 hours at 230° C. in a closed vessel. The product thus obtained may be spun well from the molten mass.

Example 18.—A mixture of 11.3 grams of ε-caprolactam and 0.05 gram of terephthalic acid chloride is heated for 8 hours at 150° C., 16 hours at 200° C. and 24 hours at 225° C. in a closed vessel. Paraffin is then added to the molten mass and ethyleneimine is passed in until 3 per cent thereof have been absorbed. The substance finally heated at 240° C. in a current of nitrogen until free from bubbles may be spun to threads which have a good affinity for acid dyestuffs.

A like result is obtained when 5 per cent of N-cyclo-hexylethyleneimine is substituted for the ethyleneimine. On this material the dyeing with acid dyestuffs has a somewhat better fastness to wetting than in the preceding case.

*Example 19.*—113 grams of $\epsilon$-caprolactam are heated with 6 grams of para-butylphenol and 1.4 grams of octadecylamine (=1/200 mol) for 48 hours at 225 to 230° C. in a closed vessel. The polymerized substance is very bright and may be drawn to good threads.

*Example 20.*—11.3 grams of $\epsilon$-caprolactam are heated with 0.15 gram (=about 1/200 mol) of magnesium oleate for 48 hours at 230° C. in a closed vessel. A very bright polymerizate may be spun very well after it has been melted at 240° C. until the liquid is calm.

*Example 21.*—113 grams of $\epsilon$-caprolactam are heated with 1 gram (=1/200 mol) of $\epsilon$-mercapto-n-amylamine hydrobromide (base obtained from $\epsilon$-bromo-n-amylamine and potassium hydrosulfide) for 48 hours at 230° C., then another 1/800 mol of the salt is added and the whole is heated further for 10 hours at 230° C. After introducing paraffin, heating is continued for 6 hours in a vacuum at the said temperature, whereupon the molten mass may be directly spun and yields useful threads. These have strongly reducing properties and still contain sulfhydril groups, which disappear by the action of oxidizing agents.

*Example 22.*—Sebacic acid is heated with an excess (15 per cent) of hexamethylenediamine while passing in nitrogen to 200 to 220° C. The product, which is still not highly polymerized, is then saturated with hydrogen bromide and mixed with so much $\epsilon$-caprolactam that there is present 1/150 gram atom of anionic bromide per 1 mol of lactam. The whole is then further heated in a closed vessel to 230 to 250° C. until the viscosity no longer increases and finally the still volatile constituents are separated from the mass by heating it at the said temperature in a vacuum. The polymerizate thus obtained may be spun well from the molten mass.

*Example 23.*—2 mols of 1.6-diaminohexane are condensed with 1 mol of 1.8-dibromooctane in alcoholic solution with addition of potassium hydroxide, and the product is separated from the potassium bromide and potassium hydroxide and finally is treated in cold alcohol with an excess of dimethyloxalate. The product consisting essentially of esters of oxamic acid is caused to react in weakly alkaline solution with dimethyl sulfate until secondary basic nitrogen is no longer to be detected. Then the mixture is hydrolyzed with hydrochloric acid and the mixture of hydrochlorides of methylated amines thus obtained is mixed with such a quantity of $\epsilon$-caprolactam that for one primary amino-group, estimated by the method of van Slyke, 150 mols of lactam are present. The whole is heated for 24 hours at 225° C. and for 24 hours at 245° C., then evacuated at 245° C. and spun. Good threads having a good affinity for acid dyestuffs are obtained.

*Example 24.*—Hexamethylene diurethylane is heated with excess of hexamethylenediamine at 150 to 210° C. Before the product has acquired a highly polymeric character heating is interrupted and the basic groups are neutralized with a hydrogen halide; the salt is then mixed with such a proportion of $\epsilon$-aminocaprolactam that there is 1 gram atom of basic aminonitrogen present per 150 mols of lactam and the whole is heated for 18 hours in an atmosphere of carbon dioxide in a closed vessel at 245° C., then for 6 hours in an open vessel into which carbon dioxide is passed and finally under strongly diminished pressure.

*Example 25.*—1 mol of $\epsilon$-caprolactam is heated with 1/600 mol of 2-aminoethyl-1.5-diaminopentane-trihydrochloride in an atmosphere of carbon dioxide in a closed glass tube for 50 hours at 230° C. The mass is then heated in a current of nitrogen for 10 hours at 240° C., whereafter the molten mass is spun. The threads thus obtained may be improved in their dyeing properties by after-treatment with epichlorhydrin, methylchloracetate or methylacrylate, particularly in respect of their fastness to wetting. With similar results one may add 1/100 mol of dicyandiamide to the melt before the spinning and then, if desired, to the spun thread with formaldehyde.

The triamine may be obtained from 2-aminoethyl-1.5-dibromopentane by reaction with liquefied ammonia. Other tri- and polyamines and their salts behave similarly, especially those which undergo no change, for example cyclic condensation, at high temperatures. There may be used for instance the amine from excess of methylenediamine or octamethylenediamine and cyanuric chloride, as well as unsymmetrical biguanides from hexamethylenediamine and octamethylenediamine. The products obtained from biguanides react easily with formaldehyde.

For after-treating the threads of the above example and generally the threads obtained as described in the foregoing examples, all modes of operation and processes are fundamentally applicable, which are described in U. S. patent applications Ser. No. 53,004 filed December 5, 1935, Ser. No. 123,868 filed February 3, 1937, and Ser. No. 123,867 filed February 3, 1937.

*Example 26.*—113 grams of $\epsilon$-caprolactam are heated with 0.47 gram (=about 1/200 mol) of taurine for 60 hours at 225° C. There is obtained a polymerizate which can be drawn to the form of good threads which have a better affinity for basic dyestuffs than that of the product of Example 1. It appears that a part of the taurine is combined as an end residue. If instead of taurine the lithium or potassium salt thereof is used, a further increase of the affinity for basic dyestuffs is attained.

*Example 27.*—113 grams of $\epsilon$-caprolactam are heated with 0.30 gram (=1/400 mol) of octamethylenediamine for 50 hours at 225 to 235° C. and the still volatile constituents are removed by raising the temperature to 245° C. Finally, while stirring there is added 1/200 mol of sebacic acid and the mixture is heated for a further 10 hours at 240 to 245° C., a vacuum being applied at the end of the heating. The highly viscous product yields threads of very good tenacity.

If instead of the sebacic acid the equivalent quantity of the isothiourea ether from omega, omega'-dimethyloctamethylene-bis-thiourea (made by the reaction of the diamine on methyl mustard oil and methylating the thiourea with dimethyl sulfate) is used, there is obtained on spinning a fiber whch is also of high tenacity, but has an enhanced affinity for acid dyestuffs.

A subsequent introduction of cyanogen iodide or of 1.8-dibromooctane into the fused mass produces a like effect, as also does an addition of a guanidine salt. In the first and third case the formation of guanidine derivatives, in some cases with a lengthening of the chain, may be supposed to occur, while in the second case a partial lengthening of the chain by bilateral alkylation must occur. The introduction of the added substance may proceed until the reagent is present in excess.

*Example 28.*—339 grams of ε-caprolactam are dissolved in twice their weight of commercial xylene, 3.1 grams of naphthalene-β-sulfonic acid (1/200 mol calculated on 1 mol of lactam) are added, and the mixture is heated in an autoclave for 64 hours at 260° C. There is obtained a viscous only feebly yellow solution from which, on standing a portion of the polymerizate separates in the form of flocks. The residue may be precipitated by means of a non-solvent, for example alcohol or acetone.

*Example 29.*—1 mol of ε-caprolactam and 1/50 mol of ε-aminocaproic acid methyl ester are heated together at 240° C. The excess pressure is then relieved and the heating continued in a vacuum for 20 hours at 240° C. The product thus obtained is easy to spin. A similar product is obtained if the hydrochloride is substituted for the methyl ester of ε-aminocaproic acid. Instead of the ε-aminocaproic acid ester the corresponding ester of 9-aminononanoic acid or 11-aminoundecanoic acid may be employed.

*Example 30.*—1 mol of ε-caprolactam is heated in a closed vessel to 230° C. together with 1/200 mol of ββ-piperidoisopropylamine (produced by reacting nitromethane with 2 mols of piperidomethanol and reducing the nitro-group to the amino group). A product which can be easily spun is obtained by melting until the reaction product flows clearly. The fibers spun therefrom show high affinity for acid dyes.

*Example 31.*—The lactimethylether (1 mol) obtained as a hydrochloride according to German Patent No. 448,447 from cyclohexanone, hydrazoic acid in benzene solution and ethyl alcohol saturated with hydrochloric acid is heated in the presence of 1/200 mol of ε-aminocaproic acid hydrochloride in chlorobenzene until the mixture boils. After the ethyl chloride has been split off, the temperature is raised, whereat the chlorobenzene distills off gradually. After the chlorobenzene is substantially removed the vessel is closed and heated to 235° C. for another 50 hours. The reaction product can be drawn out into strong fibers.

If instead of ethyl alcohol an alcohol which is easily dehydrated is employed, for instance tertiary butyl alcohol, the lactimether base may be polymerized directly, isobutylene being split off. As a catalyst naphthalene sulfonic acid or octadecylamine may be employed.

What I claim is:

1. A process which comprises heating as an initial reactant a monomeric lactam of a monoaminomonocarboxylic acid having a chain of at least 5 carbon atoms between the carboxyl and the amino group, and continuing the heating above the melting point of the lactam and above 180° C. until a substantial amount of said lactam has polymerized to the stage where the resulting polymerization product can be continuously spun from melt into uniform threads.

2. A process which comprises heating as an initial reactant a monomeric lactam of a monoaminomonocarboxylic acid having a chain of at least 5 carbon atoms between the carboxyl and the amino group, and continuing the heating above the melting point of the lactam and above 180° C. in the presence of a polymerization catalyst until a substantial amount of said lactam has polymerized to the stage where the resulting polymerization product can be continuously spun from melt into uniform threads.

3. The process set forth in claim 2 in which said polymerization catalyst is a salt-forming compound.

4. The process set forth in claim 2 in which said polymerization catalyst is a salt-forming compound and is present in amount not exceeding 1/60 equivalent calculated on the monomeric lactam.

5. A process which comprises heating as an initial reactant a monomeric lactam of a monoaminomonocarboxylic acid having a chain of at least 5 carbon atoms between the carboxyl and amino group in the presence of not more than 1/60 equivalent of a salt-forming polymerization catalyst, and adding an acid binding agent towards the end of the polymerization, said heating being at a temperature above the melting point of the lactam and above 180° C. and being continued to the stage where the resulting polymerization product can be continuously spun from melt into uniform fibers.

6. A process which comprises heating as an initial reactant a monomeric lactam of a monoaminomonocarboxylic acid having a chain of at least 5 carbon atoms between the carboxyl and amino group in the presence of not more than 1/60 equivalent of a salt-forming polymerization catalyst, and adding a resinous polyamine towards the end of the polymerization, said heating being at a temperature above the melting point of the lactam and above 180° C. and being continued to the stage where the resulting polymerization product can be continuously spun from melt into uniform fibers.

7. A process which comprises heating as an initial reactant a monomeric lactam of a monoaminomonocarboxylic acid having a chain of at least 5 carbon atoms between the carboxyl and amino group in the presence of not more than 1/60 equivalent of a salt-forming polymerization catalyst, and alkylating the product by adding a substance having an alkylating function towards the end of the polymerization, said heating being at a temperature above the melting point of the lactam and above 180° C. and being continued to the stage where the resulting polymerization product can be continuously spun from melt into uniform fibers.

8. The process set forth in claim 7 in which said substance contains basic nitrogen.

9. A process which comprises heating as an reactant molten monomeric lactam of a monoaminomonocarboxylic acid having a chain of at least 5 carbon atoms between the carboxyl and the amino group at a temperature above 180° C. in the presence of not more than 1/60 equivalent of a salt-forming polymerization catalyst, and covering the melt with a protective layer of a melted indifferent substance while continuing said heating until a substantial amount of said lactam has polymerized to the stage where the resulting polymerization product can be continuously spun from melt into uniform threads.

10. A process which comprises heating as an initial reactant epsilon-caprolactam and continuing the heating above the melting point of the lactam and above 180° C. until a substantial amount of said lactam has polymerized to the stage where the resulting polymerization product can be continuously spun from melt into uniform threads.

PAUL SCHLACK.